United States Patent [19]

Kleinhuis

[11] Patent Number: 5,629,812
[45] Date of Patent: May 13, 1997

[54] MAGNETIC-TAPE APPARATUS COMPRISING A ROTARY SCANNING DEVICE WITH STEPWISE HEAD CONTROL

[75] Inventor: Bernhard Kleinhuis, Fischbachtal, Germany

[73] Assignee: U.S. Philips Corporation, New York, N.Y.

[21] Appl. No.: 336,617

[22] Filed: Nov. 9, 1994

[30] Foreign Application Priority Data

Nov. 10, 1993 [DE] Germany ............... 43 38 391.2

[51] Int. Cl.⁶ .................................... G11B 15/14
[52] U.S. Cl. .......................................... 360/64
[58] Field of Search .................... 360/64, 51, 46; 358/335

[56] References Cited

U.S. PATENT DOCUMENTS

| | | | |
|---|---|---|---|
| 4,484,236 | 11/1984 | Wilkinson | 360/64 |
| 4,706,137 | 11/1987 | Tanaka | 360/64 |
| 4,851,935 | 7/1989 | Ohyama et al. | 360/64 |
| 4,905,103 | 2/1990 | Ohira | 360/64 |
| 4,914,531 | 4/1990 | Kaaden et al. | 360/64 |
| 5,315,453 | 5/1994 | Sato | 360/64 |
| 5,369,534 | 11/1994 | Han | 360/64 |

FOREIGN PATENT DOCUMENTS 3805438  8/1989  Germany.

*Primary Examiner*—W. C. Kim
*Attorney, Agent, or Firm*—Bernard Franzblau

[57] ABSTRACT

A magnetic-tape apparatus with a rotary scanning device in which a plurality of magnetic heads are mounted at the circumference and are associated with rotating amplifiers, which for the signal transfer are connected to stationary devices at a stator side via respective rotary transformers. The stator side of the rotary scanning device includes a generator for the generation of a phase-data signal including a periodically recurring pulse sequence bounded by synchronization pulses (S) and comprising between the synchronization pulses a bit-serial sequence of pulses whose pulse edges time the transfer of the signals from and to the magnetic heads. A feedback register circuit at the rotor side derives various timed head-switching signals for turning on/off the rotating amplifiers from an optically transmitted phase-data signal.

19 Claims, 4 Drawing Sheets

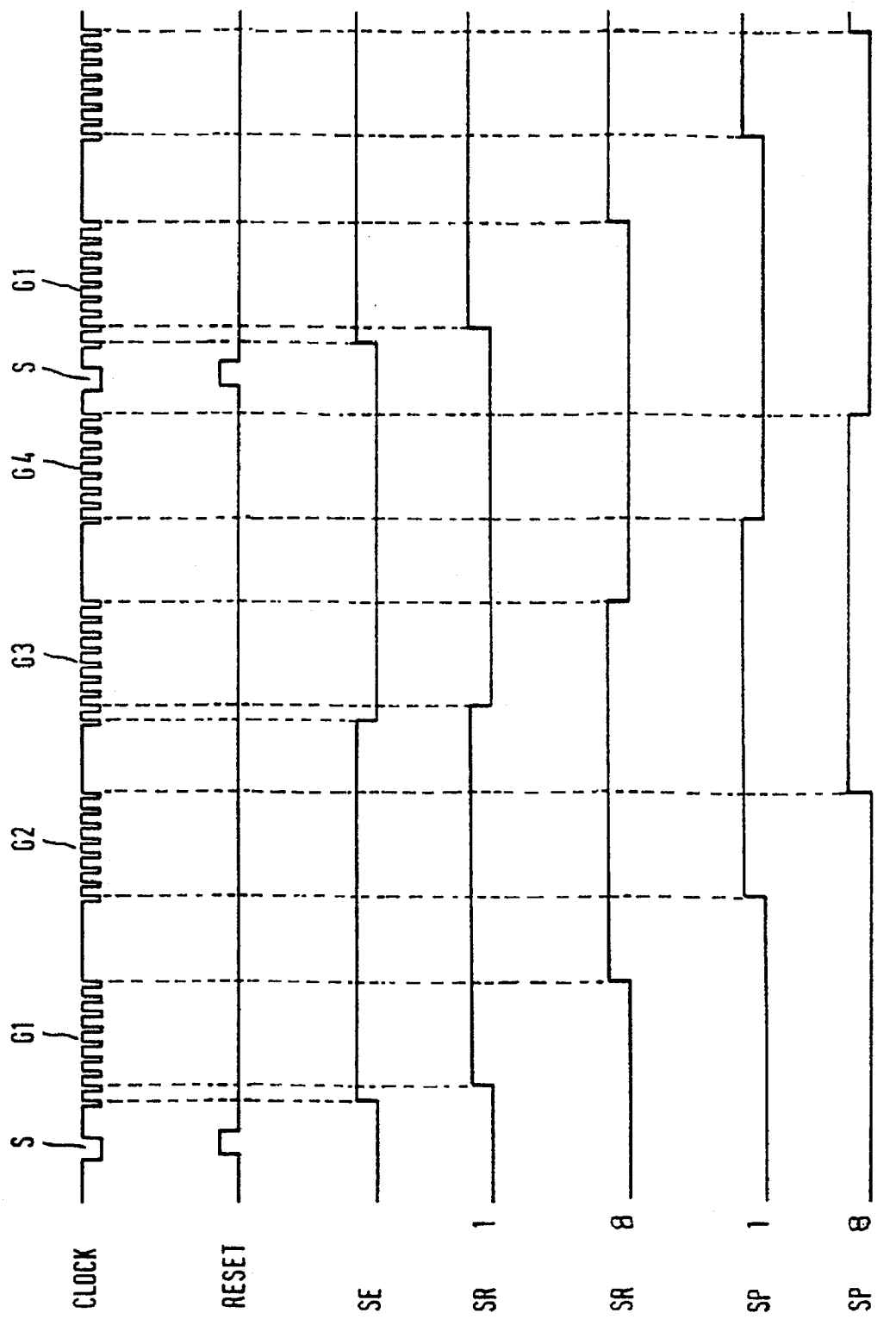

MAGNETIC-TAPE APPARATUS COMPRISING A ROTARY SCANNING DEVICE WITH STEPWISE HEAD CONTROL

BACKGROUND OF THE INVENTION

1. Field of the Invention

This invention relates to a magnetic-tape apparatus comprising a rotary scanning device, a plurality of magnetic heads mounted at the circumference of a rotary body, which heads are associated with rotating amplifiers, a plurality of rotary transformers transferring signals from a stator side to the magnetic heads at a rotor side and vice versa, a device being provided to transmit a signal relating to the rotational phase of the rotary scanning device from the stator side to the rotor side, a device for the generation of a phase-data signal being provided at the stator side of the rotary scanning device, which phase-data signal has a periodically recurring pulse sequence and synchronizes the transfer of signals from and to the magnetic heads, and a circuit for the stepwise transfer being provided at the rotor side of the rotary scanning device, which circuit is resettable by the transmitted synchronization pulse and supplies the head-switching pulses at outputs.

2. Description of the Related Art

In magnetic video tape apparatuses of the helical-scan type, a plurality of rotating magnetic heads successively scan the magnetic tape. In order to avoid interference owing to the fact that playback signals from the magnetic playback heads scanning the helical tracks just recorded are mixed with playback signals from magnetic playback heads currently not scanning the magnetic tape, it is customary (U.S. Pat. No. 4,706,137) to first apply the playback signals just supplied by the rotating magnetic playback heads to a switching device which is controlled by a head-switching signal so as to obtain a continuous playback signal which time-sequentially includes the playback signals produced by the rotating magnetic playback heads. In order to generate the head switching signal a rotational phase detector determines the rotational phase of a rotating drum carrying the rotating magnetic heads. The pulses of a phase signal supplied by the rotational phase detector are delayed in a delay device so as to enable the positions of the rotating magnetic heads to be assigned unambiguously.

Moreover, U.S. Pat. No. 4,905,103 describes a magnetic-tape apparatus with a rotary drum carrying eight magnetic heads at its circumference. In a recording mode the magnetic heads are connected to different amplifier outputs via controlled switches. Frequency dividers are provided to control the controlled switches and are synchronized by a clock signal, locked in phase to the drum rotation, and a reset signal such that the controlled switches are closed groupwise in a given rhythm.

In addition U.S. Pat. No. 4,851,935 describes a rotary scanning device comprising a rotary body which carries not only a plurality of magnetic recording and playback heads and one magnetic erase head but also the amplifiers, controlled switches and control and power supply circuits associated with the individual magnetic heads. For the power supply, to provide an erase signal and to derive a switching signal an additional rotary transformer transmits a modulated 5-MHz signal from the stator side to the rotor side. The transmitted 5-MHz signal is processed at the rotor side to generate switching signals for the various magnetic heads in addition to the supply voltage and the erase signal.

Finally, DE 38 05 438 A1 describes a system for recording and reproducing video signals in which a head disc rotates in the gap between a transversely divided drum around which a magnetic tape is wrapped along a helical path. For writing, reading and erasing the video signals in a manner which allows editing, four magnetic-head groups are 90° spaced apart along the circumference of the head disc and each comprise a normal magnetic playback head, a leading magnetic playback head, a magnetic recording head and a magnetic erase head. The normal magnetic playback heads, the leading magnetic playback heads and the magnetic recording heads have associated amplifiers arranged on the rotating head disc. The amplifiers associated with the rotating magnetic playback heads and recording heads are connected to the rotary transmission devices via controlled switches. The signals required for controlling the controlled switches are derived by means of a control circuit which is also arranged on the rotary head disc and which comprises a number of monostable multivibrators corresponding to the number of controlled switches, the monostables being triggered by the signal from a light barrier.

SUMMARY OF THE INVENTION

To record and reproduce digital HDTV signals (High Definition Television) the "active" rotary body should accommodate not only a large number of magnetic heads but also the amplifiers and switches associated with the magnetic heads and a power supply circuit. As the space available on the rotary body in order to accommodate the circuits at the rotor side is limited, it is an object of the present invention to minimise the circuitry at the rotor side in a magnetic-tape apparatus of the type defined in the opening paragraph.

According to the invention this object is achieved in that the phase-data signal is bounded by synchronization pulses and comprises between the synchronization pulses a bit-serial sequence of pulses which control the circuit for the stepwise transfer.

The magnetic-tape apparatus in accordance with the invention has the advantage that the circuitry on the "active" rotary body of the rotary scanning device can be minimised by the use of such a phase-data signal. A further advantage is that the head switching signals required for controlling the magnetic head amplifier can be adapted readily to the positions of the magnetic heads mounted at the circumference of the rotary body.

According to the invention it is advantageous to generate the phase-data signal in a device comprising an address counter for counting pulses of a stator-side clock signal obtained by multiplication of a tacho-pulse signal which is synchronous with the rotation of the rotary scanning device, which address counter produces an address signal at an address output, and a read-only memory whose address input receives the address signal from the address output of the address counter and in dependence upon the address value of the applied address signal produces at a data output a data signal forming the phase-data signal, in which signal the timing of the pulse edges of the pulses corresponds to the instantaneous position of the magnetic heads mounted at the circumference of the rotary scanning device.

To process the phase-data signal at the rotor side of the rotary scanning device there is provided at least one light-sensitive diode for receiving the optically transmitted phase-data signal, a cathode of the diode being at a positive potential and an anode of the diode being connected to a less positive potential via a first resistor, in that a transistor stage has its base-collector path arranged in parallel with the first resistor and has its emitter terminal connected to the positive potential via a second resistor, and in that a comparator has a first input connected directly to the emitter terminal of the transistor stage and has a second input connected to said emitter terminal via an integration network comprising a resistor and a capacitor, and a processed phase-data signal is available at the output of the comparator as the rotor-side clock signal for the circuit for the stepwise transfer.

BRIEF DESCRIPTION OF THE DRAWINGS

An embodiment of the invention will now be described in more detail, by way of example, with reference to the drawings. In the drawings:

FIGS. 4a–4g show waveform diagrams to explain the circuit shown in FIG. 3; and

In the Figures like elements bear the same reference symbols.

DESCRIPTION OF THE PREFERRED EMBODIMENT

Figure 1:
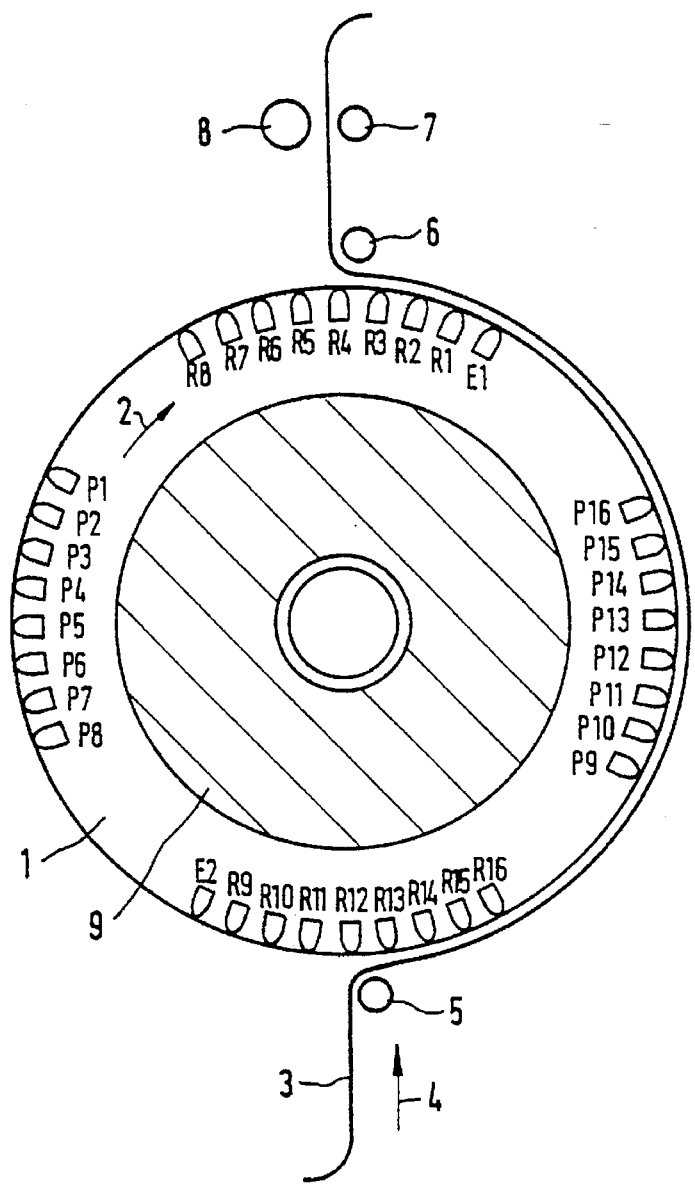
FIG. 1 shows diagrammatically a rotary scanning device for the digital recording and reproduction of HDTV signals.

In FIG. 1 a rotary body bears the reference numeral 1 and is rotatable in the direction indicated by an arrow 2. The rotary body may be, for example, the rotary head disc or the rotary drum of a tape guide body. A magnetic tape 3 is wrapped around the rotary body 1 along a helical path over an angular range slightly larger than 180°, so that tracks are scanned which extend obliquely relative to the tape edge. Two guide elements 5 and 6 guide the magnetic tape 3 in the direction indicated by an arrow 4. The transport of the magnetic tape 3 is effected by means of a capstan 7 and a pressure roller 8 which cooperate with the magnetic tape 3.

At its circumference the rotary body 1 carries a plurality of magnetic heads. These magnetic heads include magnetic recording heads R1 to R16, magnetic erase heads E1 and E2, and magnetic playback heads P1 to P16. The magnetic playback heads P1 to P16, the magnetic recording heads R1 to R16 and the heads E1 and E2 are combined to form two groups. The magnetic playback heads P1 and P9, P2 and P10, P3 and P11 etc. are disposed opposite one another 180° spaced apart. Likewise, the magnetic recording heads are spaced apart along the circumference of the rotary body 1, the magnetic recording heads R1 and R9, R2 and R10 etc. being disposed opposite one another. The erase heads E1 and E2 are mounted on the circumference of the rotary body 1 before the magnetic recording heads R1 to R8 and R9 to R16, respectively. In this case the erase heads E1 and E2 are also 180° spaced apart. The four magnetic head groups are spaced at 90° from one another. The magnetic playback heads P1 to P16 are so positioned relative to the magnetic recording heads R1 to R16 in the direction of the track height that they can scan the tracks recorded by the preceding magnetic recording heads R1 to R16. The track width of the preceding erase heads E1 to E2 is such that all the eight tracks can be erased at a time.

The rotary body 1 carries a printed circuit board 9 for the amplifiers and control circuits for the individual magnetic heads.

As stated hereinbefore, the device shown in FIG. 1 serves for the digital recording and reproduction of HDTV signals. These HDTV signals appear at a data transfer rate of 1.2 Gbit/s. With the present tape and head materials this data transfer rate enables acceptable error rates to be attained at a surface storage density of 11 Mbit/cm$^2$. For details about the digital recording/reproduction of HDTV signals reference is made to the DE magazine Fernseh- und Kinotechnik, no. 12, 1991, pp. 661 to 665.

Figure 2:
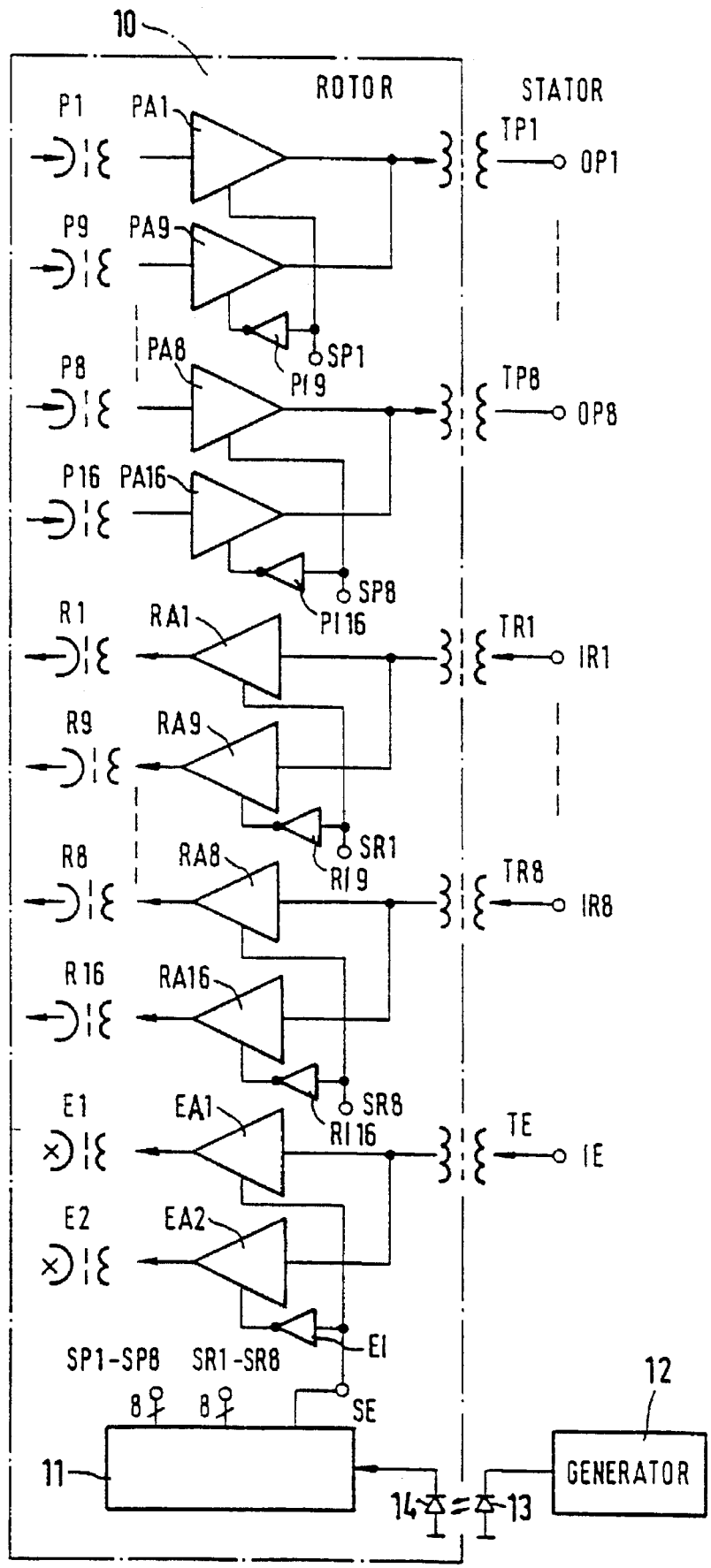
FIG. 2 is a systematic block diagram of the signal and switching paths at the rotor side of the rotary scanning device.

The block diagram in FIG. 2 shows diagrammatically signal paths from and towards the magnetic heads at the circumference of the rotary body 1. The elements shown within the dash-dot frame 1 are arranged at the rotor side of the rotary shown within the dash-dot frame 1 are arranged at the rotor side of the rotary scanning device. These elements are the magnetic playback heads P1 to P16 mounted at the circumference of the rotary body 1, the magnetic recording heads R1 to R16 and the magnetic erase heads E1 and E2. They further include the playback preamplifiers PA1 to PA16 associated with the magnetic playback heads P1 to P16, the recording amplifiers RA1 to RA16 associated with the magnetic recording heads, and the erase amplifiers EA1 and EA2 associated with the magnetic erase heads E1 and E2.

Amplifiers associated with facing magnetic heads form an amplifier pair which is controllable by a common head switching signal. In the present embodiment the playback preamplifiers PA1 and PA9 associated with the facing magnetic playback heads P1 and P9 form such an amplifier pair. The amplifiers each have a control input to which control signals SP1 to SP8, SR1 to SR8 and SE are applied. Inverters PE9 to PE16, RE9 to RE16 and EI are arranged in the input lines to the control inputs of the amplifiers of a respective facing magnetic head group. As a result of the 180° wrap of the magnetic tape 3 around the rotary body 1, each time one magnetic head of an amplifier pair is in contact with the magnetic tape 3. When a magnetic head loses contact with the magnetic tape the facing magnetic head is applied to the magnetic tape. Thus, the amplifiers of an amplifier pair merely have to be turned on and turned off by means of a single control signal, the inverters ensuring that when one amplifier is turned on the associated other amplifier of the amplifier pair is turned off and vice versa.

The head switching signals SP1 to SP8, SR1 to SR8 and SE applied to the amplifier pairs are generated in a control device 11, whose circuit arrangement will be described in detail with reference to FIG. 3.

The outputs of the playback preamplifier of each amplifier pair are interconnected and connected to a rotor winding of a rotary transformer. Thus, the outputs of, for example, the pair of playback preamplifiers PA1 and PA9 are interconnected and connected to the rotor winding of the rotary transformer TP1. The playback signal appearing at the rotor winding of the rotary transformer TP1 is induced into the stator winding of the rotary transformer TP1 and is available on an output terminal OP1. Likewise, the playback signals from other playback preamplifier pairs reach the output terminals OP2 to OP8 via windings of the other rotary transformers TP2 to TP8.

For the sake of simplicity FIG. 2 shows only two pairs of playback preamplifiers, which serve the first and the eighth playback channel.

To transmit the recording signals appearing at input terminals IR1 to IR8 eight further rotary transformers TR1 to TR8 have been provided. Again, only two of the total of eight rotary transformers are shown for the sake of simplicity.

The digital recording signal of a first recording channel, which appears on an input terminal IR1, is applied to a stator winding of a rotary transformer TR1 to be induced into the rotor winding. The rotor winding is connected to inputs of the recording amplifier pair RA1 and RA9. The recording amplifier RA1 has an output connected to the magnetic recording head R1 and the recording amplifier RA9 has an output connected to the magnetic recording head R9.

In the same way as the playback preamplifiers PA1 to PA16, the recording amplifiers RA1 to RA16 have control inputs to which control signals SR1 to SR8 are applied for turning on and turning off the recording amplifiers. Inverters RI9 to RI16 are arranged in the lines to the control inputs of the recording amplifiers RA9 to RA16 associated with the magnetic recording heads R9 to R16 and have their inputs connected to a control input of a recording amplifier associated with a magnetic recording head which is spaced at 180°, so that again facing recording amplifiers RA1 and RA9, RA2 and RA10 etc. can be turned on and off alternately.

Likewise, the erase signal is transmitted from the stator side to the rotor side. By means of a rotary transformer TE the erase signal is inductively applied from an input terminal IE to the erase amplifiers EA1 and EA2, which are controlled by a control signal EI, and from these amplifiers it is applied alternately to the magnetic erase heads, which are 180° spaced apart.

Whereas the playback signals from the eight playback channels, the recording signals from the eight recording channels and the erase signal are transmitted inductively from the stator side to the rotor side, a phase-data signal required for controlling the amplifiers is optically transmitted from the stator side to the rotor side. The phase-data signal, which is generated in a generator circuit 12 at the stator side, is applied to a light-emitting diode 13, whose light is received by a light-sensitive diode 14 on the rotary body 1. This light-sensitive diode 14 re-converts the optical signal into an electric signal, which is applied to an input of the control device 11. Details of the generator circuit 12 will be described with reference to FIG. 5.

Figure 3:
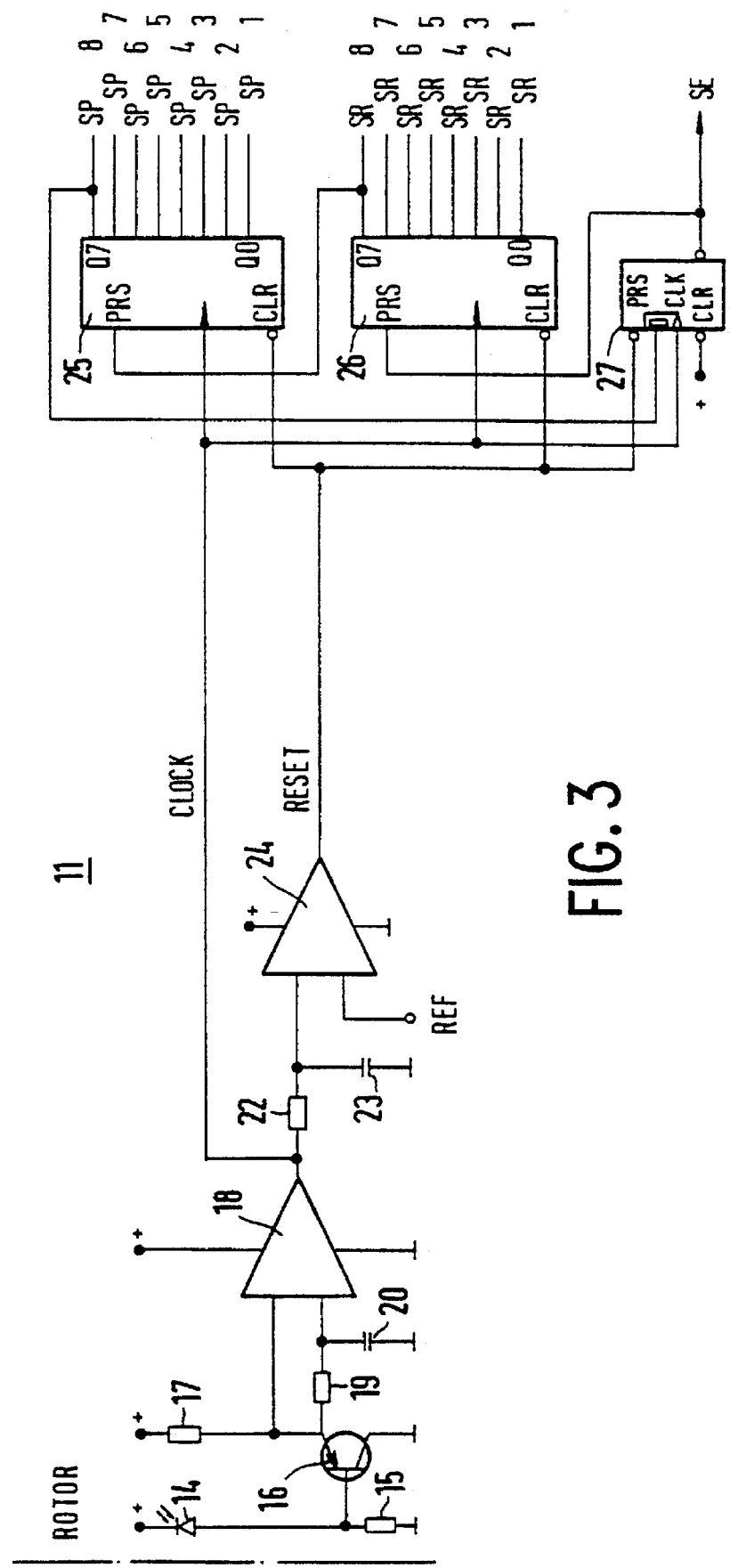
FIG. 3 shows a circuit arranged at the rotor side of the rotary scanning device, for deriving head-switching signals in accordance with the invention.

FIG. 3 shows the circuit of the control device 11 arranged at the rotor side of the rotary scanning device. The cathode of the light-sensitive diode 14 at the rotor side is connected to a positive potential (+), the anode being at ground potential via a resistor 15. The base of a PNP transistor 16 is connected to the anode of the light-sensitive diode 14. The collector of the PNP transistor 16 is connected to ground potential and the emitter is connected to the positive potential via a resistor 17. The PNP transistor is followed by a comparator 18 having one input connected directly and having another connected via an RC network 19, 20 which forms an integration network. The output signal at an output of the comparator 18 is applied to a further comparator 24 via a further integration network 22,23, a reference signal REF being applied to the other input of the further comparator. Moreover, the signal (CLOCK) appearing at the output of the comparator 18 is applied to the clock inputs of shift registers 25,26 and 27. The signal (RESET) appearing at the output of the further comparator 24 is applied to reset inputs of the shift registers 25,26 and 27. An inverting output of the single-stage shift register 27 is connected to an enable input of the eight-stage shift register 26 and an output Q7 of the eight-stage shift register 26 is connected to an enable input of a further eight-stage shift register 25. The output Q7 of the eight-stage shift register 25 is connected to a D input of the single-stage shift register 27, whose reset input is at a positive potential. The head switching signals SP1 to SP8 for the playback preamplifier pairs PA1 and PA9,PA2 and PA10 etc. are available at the outputs Q0 to Q7 of the eight-stage shift register 25. The head switching signals SR1 to SR8 for the recording amplifier pairs RA1 and RA9, RA2 and RA10 etc. are available at the output of the eight-stage shift register 26, and the head switching signal SE for the erase amplifier pair EA1 and EA2 is available at the output of the single-stage shift register 27.

The PNP transistor 16 connected to the anode of the light-sensitive diode 15 functions as an impedance matching stage which provides a low-impedance path for the phase-data signal from the light-sensitive diode 14 to the comparator 18. The RC network 19,20 serves to define the operating point of the comparator 18. The comparator 18 amplifies the phase-data signal so as to provide logic levels for the operation of the shift registers 25,26 and 27.

The phase-data signal (CLOCK) available at the output of the comparator 18 has a signal waveform as shown in FIG. 4a. The signal comprises a periodically recurring pulse train bounded by synchronization pulses S and comprising between the synchronization pulses S a bit-serial sequence of pulse groups G1,G2,G3 and G4, the transfer of signals from and to the magnetic heads being timed by means of the edges of the pulses of these groups. In this pulse train, referred to as the phase-data signal, the pulse width of the negative synchronization pulses S is larger than the pulse width of the negative pulses in the groups G1,G2,G3 and G4. Through integration by means of the RC integration network 22,23 it is therefore possible to derive a reset signal (RESET) as shown in FIG. 4b whose timing corresponds to the synchronization pulses S in the phase-data signal shown in FIG. 4a. The reset signal (RESET) resets the seventeen-stage shift-register circuit 25,26,27. On the rising edge of a first pulse in the group G1 of the phase-data signal in FIG. 4a the output level of the shift register 27 changes from a low logic level to a high logic level (FIG. 4c). After 17 further rising edges the output of the shift register 27 again assumes a low logic level on the rising edge of the first pulse in the group G3. As a result of the arrangement of the seventeen-stage shift-register circuit 25,26,27 the output Q0 of the shift register 26 assumes a high logic level when the rising edge of the second pulse in the group G1 appears and again a low logic level when the positive edge of the second pulse in the group G3 occurs. The logic levels at the other outputs of the shift register 26 will change accordingly when rising edges of subsequent pulses in the groups G1 and G3 appear. FIGS. 4d and 4e show the corresponding time relationships of the head-switching signals SR1 and SR8 with the phase-data signal (CLOCK) in FIG. 4a. The head-switching signals SP1 to SP8 for switching the playback preamplifiers PA1 to PA16 are similarly produced when the rising edges of the pulses in the groups G2 and G4, respectively (FIGS. 4f and 4g, respectively) appear.

In a practical embodiment the pulse width of the synchronization pulses S is 100 μs and the pulse width of the pulses in the four groups G1 to G4 is 10 μs. The seventeen-stage shift-register circuit 25,26,27 is constructed by means of CMOS circuits. The optical transmission of the phase-data signal is preferably effected by means of infrared-sensitive diodes.

Figure 5:
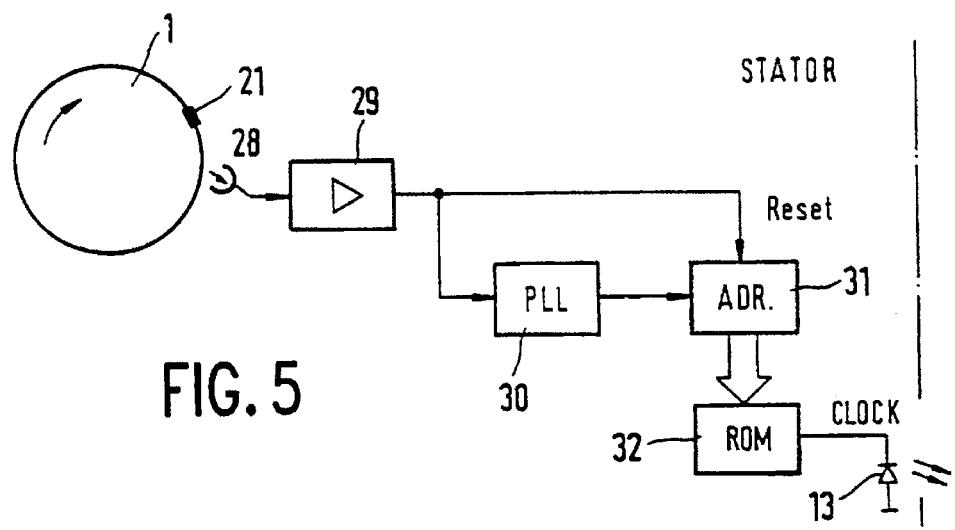
FIG. 5 is a block diagram of a phase-data signal generation circuit provided at the stator side of the rotary scanning device.

FIG. 5 shows a phase-data signal generation device arranged at the stator side of the rotary scanning device. In this generation device a magnet 21 mounted at the circumference of the rotary body 1 induces a voltage pulse into the head winding of a stationary magnetic head 28 when it moves past this head, the timing of this voltage pulse being a measure of the instantaneous angular phase of the rotating rotary body 1. The tacho-pulse signal which can be taken from the stationary magnetic head 28 is amplified in an amplifier 29 and is applied to the input of a phase-locked loop 30 and to the reset input of an address counter 31. The frequency of the signal supplied by the phase-locked loop 30 is approximately 500 kHz and is locked to a multiple of the frequency of 150 Hz of the tacho-pulse signal. The signal appearing at an output of the phase-locked loop 30 is applied to the clock input of the address counter 31, which is constructed in such a manner that it increments the address values at its address output in dependence upon the clock frequency. When a tacho-pulse occurs the address counter 31 is reset to the address value zero. The address output of the address counter 31 is connected to the address input of a read-only memory 32, which stores a table which is such that given data word values are supplied depending on the applied address words. The sequence of the supplied data word values corresponds to the pulse sequence of the phase-data signal shown in FIG. 4a.

Preferably, the table in the read-only memory 32 is such that the timing of the binary bit sequence in the data words at the data output of the read-only memory 32 corresponds to the positions of the magnetic heads mounted at the circumference of the rotary body 1. The accuracy of the resulting relationship between the head position at the circumference of the rotary body 1 and the corresponding edges in the phase-data signal (FIG. 4a) in principle depends on the multiplication factor of the phase-locked loop 30, which operates as a frequency multiplier. Preferably, the frequency of the clock signal applied to the address counter 31 is substantially higher than the rotational frequency of the rotary body 1.

The arrangement shown in FIG. 5 for generating a phase-data signal is a preferred embodiment. It is obvious that the phase-data signal may also be generated in another manner than indicated herein.

Although the embodiment, which has been described hereinbefore, shows that the circuit (25,26,27) for the stepwise transfer receives the bit serial bit sequence of pulses, each time between two synchronization pulses it should be clear that said circuit (25,26,27) on the rotor side is in fact programmable from the stator side. It should be clear that the circuit (25,26,27) may be modified such that a one time bit serial sequence of pulses between one single pair of synchronization pulses is stored in a programmable memory. As a result the magnetic tape recording apparatus will perform identically with respect to the apparatus described with reference to the drawings upon this programming action.

It will be evident that a number of different ways of programming exists. Another way of programming the circuit for stepwise transfer will work as follows: each time a bit serial sequence of pulses comprises three groups of pulses: a first group identifying a single magnetic head and the second and third group respectively define a switch on and switch off time respectively. The latter data switch on/switch off time are used as addresses to store in a memory the first group identifying the corresponding magnetic head. The memory is read out via a ring counter, which acts as a clock and which output provides addresses to read out the memory.

From the above it is clear that the circuit for the stepwise transfer can be realized and programmed in several ways. One of the advantages of the programmable circuit on the rotor side is that the magnetic tape recording apparatus can be built in a uniform way, while still keeping the flexibility to make the recording apparatus record in one of numerous recording methods. This is important in the field of digital magnetic recording where more than one recording standard or even more recording modes within a standard are used. Now, due to the invention a recording apparatus can be programmed to record in one mode or standard and if necessary can be reprogrammed to record in another mode or standard and thus can even be adapted to a recording standard to be defined.

I claim:
1. A magnetic-tape recording apparatus comprising:
a rotary scanning device with a plurality of magnetic heads mounted at the circumference of a rotary body, which heads are associated with rotating amplifiers, a plurality of rotary transformers transferring signals from a stator side to the magnetic heads at a rotor side and vice versa, a device being provided to for transmitting a signal relating to the rotational phase of the rotary scanning device from the stator side to the rotor side, a device for the generation of a phase-data signal provided at the stator side of the rotary scanning device, said phase-data signal providing a periodically recurring pulse sequence which synchronizes the transfer of signals from and to the magnetic heads, and a circuit for a stepwise transfer provided at the rotor side of the rotary scanning device, which circuit is resettable by a transmitted synchronization pulse and supplies head-switching pulses at outputs,
wherein the phase data signal is bounded by synchronization pulses (S) and the circuit for the stepwise transfer at the rotor side is programmable by one or more pulses present between the synchronization pulses.

2. A magnetic tape recording apparatus as claimed in claim 1, wherein the circuit is programmable by one or more bit serial sequences of pulses respectively between one or more pairs of synchronization pulses, respectively.

3. A magnetic tape recording apparatus as claimed in claim 2, wherein the circuit is programmable by one single bit serial sequence of pulses between one single pair of synchronization pulses.

4. A magnetic tape recording apparatus as claimed in claim 3, wherein a program defined by the bit serial sequence of pulses is stored in the circuit for the stepwise transfer.

5. A magnetic tape recording apparatus as claimed in claim 2, wherein the phase-data signal comprises, between each pair of synchronization pulses (S), a bit-serial sequence of pulses which control the circuit for the stepwise transfer.

6. A magnetic-tape apparatus as claimed in claim 5, wherein the device for generating the phase-data signal comprises; an address counter for counting pulses of a stator-side clock signal, means for deriving the stator-side clock signal by multiplication of a tacho-pulse signal which is synchronous with the rotation of the rotary scanning device, wherein said address counter produces an address signal at an address output, and a read-only memory having an address input that receives the address signal from the address output of the address counter and in dependence upon the address value of the applied address signal produces at a data output the phase-data signal in which the timing of the pulse edges of the pulses corresponds to the instantaneous position of the magnetic heads mounted at the circumference of the rotary scanning device.

7. A magnetic-tape apparatus as claimed in claim 6, wherein the phase-data signal generating device includes a phase-locked loop which receives a tacho-pulse signal from the rotary scanning device is and which supplies a clock signal for the address counter.

8. A magnetic-tape apparatus as claimed in claim 6, wherein the address counter is resettable by the tacho-pulse signal from the rotary scanning device.

9. A magnetic-tape apparatus as claimed in claim 6, comprising an optical transmission path for transmitting the phase-data signal at the data output of the read-only memory from the stator side to the rotor side of the rotary scanning device.

10. A magnetic-tape apparatus as claimed in claim 2, wherein the rotor side of the rotary scanning device includes at least one light-sensitive diode for receiving an optically transmitted phase-data signal, a cathode of the diode being at a positive potential (+) and an anode thereof being connected to a less positive potential via a first resistor, a transistor stage has its base-collector path coupled in parallel with the first resistor and has its emitter terminal connected to the positive potential (+) via a second resistor, and wherein a comparator has a first input connected directly to the emitter terminal of the transistor stage and has a second input connected to said emitter terminal via an integration network comprising a resistor and a capacitor, whereby a processed phase-data signal is available at an output of the comparator as a rotor-side clock signal for the circuit for the stepwise transfer.

11. A magnetic-tape apparatus as claimed in claim 1, further comprising an integration stage arranged at the rotor side of the rotary scanning device, which stage receives a clock signal and supplies a reset signal for the circuit for the stepwise transfer.

12. A magnetic-tape apparatus as claimed in claim 1, wherein the magnetic tape is wrapped around the rotary scanning device through an angle of 180°, in that four groups of magnetic heads are arranged at the circumference of the rotary body in segments which are 90° spaced apart, which magnetic heads are combined such that two facing groups of the four groups include magnetic playback heads only and the other two facing groups include magnetic recording heads, and each periodically recurring pulse sequence bounded by synchronization pulses (S) comprises four pulse groups (G1 to G4) in which the timing of the pulse edges of the pulses in the first group defines the turn-on instant and the timing of the pulse edges of the pulses in the third group defines the turn-off instant in the transmission of signals to individual magnetic erase heads on the rotary scanning device and the magnetic recording heads, and in which the timing of the pulse edges of the pulses in the second group defines the turn-on instant and the timing of the pulse edges of the pulses in the fourth group (G4) defines the turn-off instant in the transmission of the signals from the individual magnetic playback heads.

13. A magnetic-tape apparatus as claimed in claim 12, wherein the rotating amplifiers associated with the magnetic heads have a respective control input for turning the amplifiers on/off, in that inverters are connected in the input lines to the control inputs of the amplifiers associated with one facing magnetic head group of said two facing groups and to one facing magnetic head group of the other two facing groups and in that inputs of the inverters are connected to respective control inputs of respective amplifiers associated with facing magnetic heads of its associated facing group and receive the generated head switching pulses.

14. A magnetic-tape apparatus as claimed in claim 1, wherein the circuit for the stepwise transfer comprises a ring counter.

15. A magnetic-tape apparatus as claimed in claim 1, wherein a number n of the magnetic heads mounted at the circumference of the rotary body form a segment and in that each time n pulses of the phase-data signal are combined to form a pulse group (G1 to G4).

16. The magnetic-tape apparatus as claimed in claim 1, wherein the plurality of magnetic heads are positioned in four groups of magnetic heads at the circumference of the rotary member in segments spaced apart 90°, first and third opposed groups of said magnetic heads comprising recording heads and second and fourth opposed groups of said magnetic heads comprising playback heads, said periodic pulse sequence comprising first, second, third and fourth pulse groups which control the magnetic heads via the respective amplifiers, wherein each pair of amplifiers associated with opposed magnetic heads of the first and third groups and the second and fourth groups of magnetic heads are controlled via a respective pulse from the appropriate pulse group with one amplifier of each amplifier pair having an inverter interposed so that one amplifier of an amplifier pair is turned-on while the other is turned-off, and vice versa, by its respective pulse.

17. A magnetic-tape apparatus comprising:

a rotary scanning device comprising a rotary member having a plurality of magnetic heads mounted at the circumference thereof, a plurality of amplifiers mounted on the rotary member and electrically coupled to respective magnetic heads, a plurality of rotary transformers for the transfer of signals from a stator side of the apparatus to the magnetic heads and vice versa, means located on the stator side for transmitting to a control device located on the rotary member a phase-data signal related to the rotational position of the rotary member, said phase-data signal comprising a periodic pulse sequence straddled by first and second synchronization pulses which, via the control device, synchronizes a transfer of signals to and from the magnetic heads, and means for moving a magnetic tape past the rotary member.

18. The magnetic-tape apparatus as claimed in claim 17 wherein the control device controls said transfer of signals via the plurality of amplifiers.

19. The magnetic-tape apparatus as claimed in claim 18 wherein the magnetic-tape covers an angle of 180° of the rotary member, the plurality of magnetic heads being positioned in four groups of magnetic heads at the circumference of the rotary member in segments spaced apart 90°, first and third opposed groups of said magnetic heads comprising only recording heads and a respective erase head and second and fourth opposed groups of said magnetic heads comprising only playback heads, said periodic pulse sequence comprising first, second, third and fourth pulse groups in which the pulses of the first and third pulse groups control turn-on and turn-off respectively of the recording heads and the pulses of the second and fourth pulse groups control turn-on and turn-off respectively of the playback heads, and the first and second synchronization pulses control operation of the erase heads.

\* \* \* \* \*